United States Patent [19]

Pirchio

[11] Patent Number: 4,917,341
[45] Date of Patent: Apr. 17, 1990

[54] TRESTLE WITH CROSSED LEGS FOR SUPPORTING MUSICAL KEYBOARDS

[75] Inventor: Paolo Pirchio, Castelfidardo, Italy

[73] Assignee: MPM Music - S.r.l., Castelfidardo, Italy

[21] Appl. No.: 285,060

[22] Filed: Dec. 16, 1988

[30] Foreign Application Priority Data

Dec. 22, 1987 [IT] Italy .................... 19449/87[U]

[51] Int. Cl.$^4$ .......................................... F16M 11/32
[52] U.S. Cl. .................................. 248/164; 108/118; 211/195
[58] Field of Search ............ 248/164, 431, 432, 163.1, 248/158; 211/149, 195, 182; 108/118, 119, 90, 93

[56] References Cited

U.S. PATENT DOCUMENTS

| | | | |
|---|---|---|---|
| 1,646,165 | 10/1927 | Naujoks | 248/122 |
| 2,271,332 | 1/1942 | Ellington | 403/93 X |
| 4,245,850 | 1/1981 | Boudreau | 403/92 X |
| 4,321,874 | 3/1982 | Cenna | 248/164 X |
| 4,405,107 | 9/1983 | Clyburn | 248/122 |
| 4,407,045 | 10/1983 | Boothe | 403/92 X |
| 4,580,750 | 4/1986 | Spellman | 108/118 X |
| 4,632,473 | 12/1986 | Smith | 211/182 X |
| 4,684,091 | 8/1987 | Moreschi | 248/163.1 X |
| 4,754,711 | 7/1988 | Solomon | 248/122 X |
| 4,763,865 | 8/1988 | Danner | 248/164 |

FOREIGN PATENT DOCUMENTS 2237747 2/1973 Fed. Rep. of Germany ...... 403/234

Primary Examiner—J. Franklin Foss
Attorney, Agent, or Firm—Leonard Bloom

[57] ABSTRACT

This invention concerns a trestle support for musical keyboards of the type equippd with legs crossed in the form of an 'X', equipped with a new device that permits rapid and easy adjustment of the angle of spread of the aforesaid legs and the height of the keyboard above the ground by means of a special new and original joint that allows for easy and quick mounting and detachment of transversal tubular bars positioned at either end of the legs of the trestle, those positioned at the base resting on the ground and acting as stabilizing feet for the trestle, while the ones positioned at the upper ends act as supporting arms for the keyboard.

9 Claims, 2 Drawing Sheets

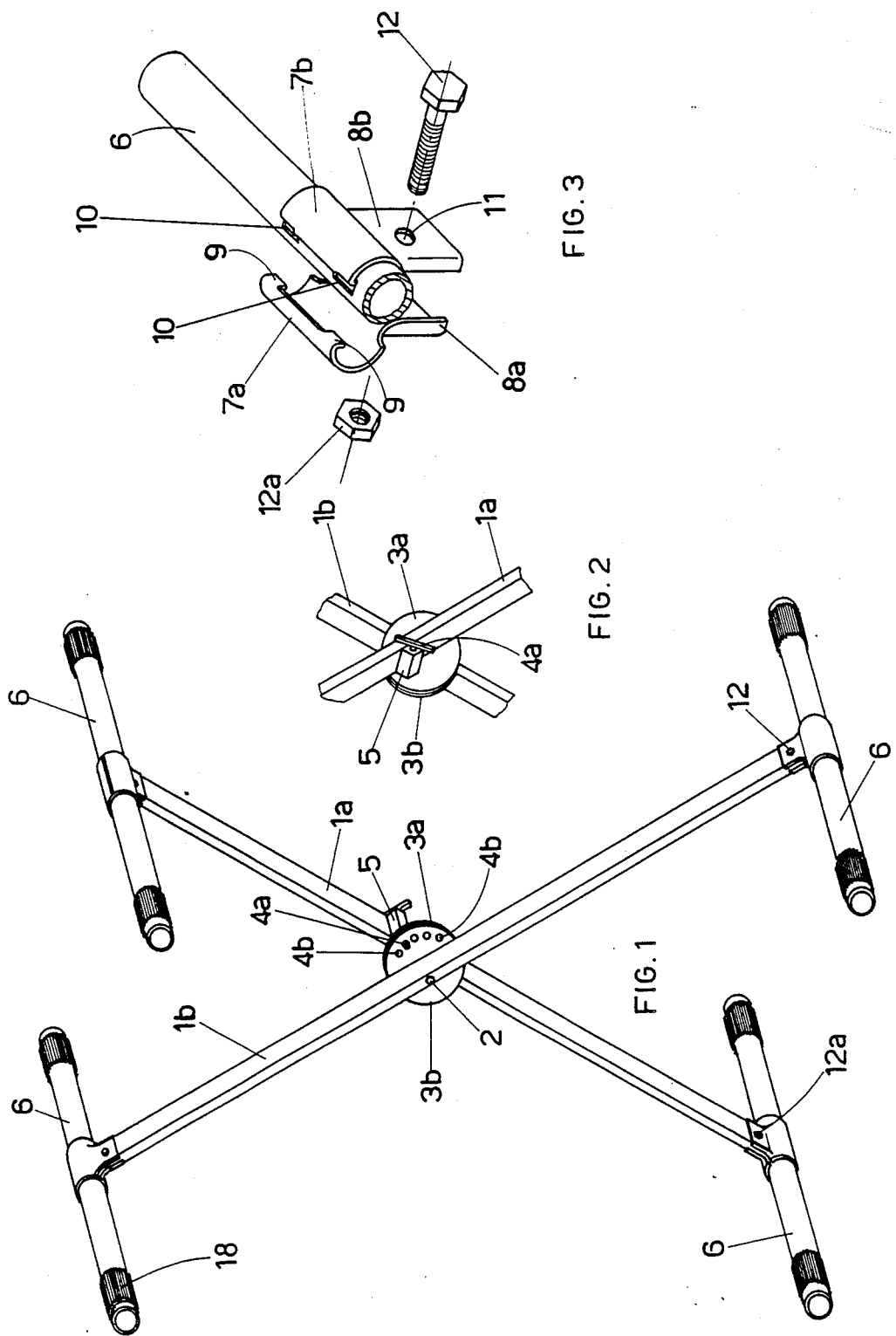

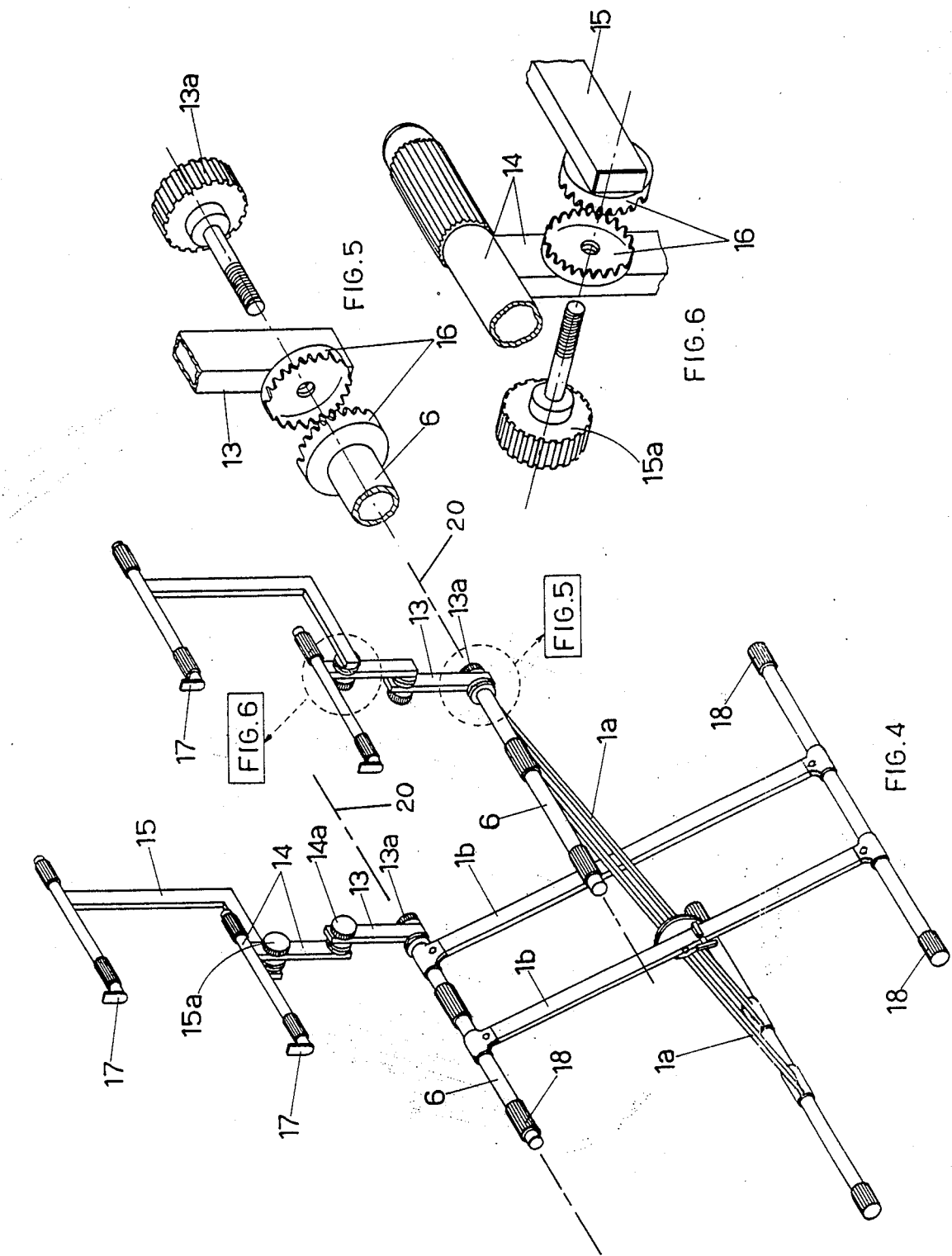

TRESTLE WITH CROSSED LEGS FOR SUPPORTING MUSICAL KEYBOARDS

This patent application for an industrial utility design concerns a trestle support for musical keyboards of the type with legs crossed in the form of an 'X', equipped with a new device that permits rapid and easy adjustment of the angle of spread of the aforesaid legs and therefore the height of the keyboard above ground.

The design according to the invention also has the special characteristic of using a special new and original joint that allows for easy and quick mounting and detachment of transversal tubular bars positioned at either end of the legs of the trestle, those positioned at the base acting as stabilising feet for the trestle, while the ones positioned at the upper ends act as supporting arms for the keyboard.

Because of the aforementioned joint the trestle according to the invention can be packed inside containers of limited dimensions, especially width-wise, in that said transversal bars may be removed from the legs of the trestle before packing, so that the maximum amount of space required corresponds to the length of the legs which, when arranged in the completely closed position, lie side by side.

The need to reduce the amount of space occupied by the trestle both during transport from the manufacturer to the retailer and during storage gave rise to the idea of this joint which, as already mentioned, provides a remedy to the problems of space characteristic of present trestle supports for keyboards, the transversal arms of which are welded to the trestle legs.

With regard to setting and blocking in the open position, the trestles constructed at present generally use a connecting rod composed of a shaft with one of its ends hinged to one of the two legs of the trestle, while on the other end there is a set of holes and a set of teeth designed to couple up with a connecting pin provided on the other leg of the trestle.

Once the crossed trestle legs have been opened to the desired angle an operation is required to render them stable that is anything but convenient and rapid, whereby said shaft has to be duly unhooked every time the position of the trestle needs changing so as to adjust the height of the keyboard in relation to the ground.

Bearing in mind the disadvantages mentioned which in fact compromise to a considerable extent the functionality of the present models of trestle, a new style of trestle has been designed which, while still being composed of two legs crossed in the shape of an 'X', is a modular structure that is easy and rapid to assemble and dismantle at the actual site of use, and is also equipped with a device for controlling the angle of spread this is simple and quick to adjust.

With regard to the joint that connects the transversal bars to the two ends of each leg of the trestle according to the invention, it is composed of two identical semi-circular shoes, each bearing a box-type wing within which the terminal section of the leg is clasped, while the transversal bar that, as already mentioned, goes to make up one of the trestle feet or an arm for supporting the keyboard, is clasped between the two semi-circular shoes.

To prevent said transversal bar from sliding lengthwise inside the two shoes of the connecting joint two aligned slots are provided along a generatrix of said bar, within which two radial tabs hook, said tabs being provided on the inside of the longitudinal edge of each semi-circular shoe.

An ordinary nut and bolt are used to tighten the two box-type wings of the joint around the ends of the trestle legs; said bolt is inserted through two holes provided for the purpose in the centre of each of the abovementioned box-type wings and another hole provided for this purpose in the ends of each trestle leg.

As regards the adjustment mechanism for setting the angle of spread of the trestle legs and blocking both legs in the desired position, the design according to the invention involves the use of two metal plate disks, welded at the respective central points of the two trestle legs and positioned co-axially with respect to the horizontal pin around which the two legs may freely rotate.

On one of said disks a series of holes is provided, spaced at regular intervals along an arc of circumference near the outer edge, while on the external face of the other disk there is a horizontal pin constantly under pressure from a spring that pushes it against the other disk so that said pin, being positioned at the same distance from the centre as the arc along which said holes are distributed, tends to automatically slot into one of the set of holes present on the other disk, thus hooking together the two legs of the trestle.

Setting the position of the trestle only requires a simple manual operation whereby, momentarily overcoming the resistance provided by the spring, said pin is disengaged from one hole and then inserted into another of the holes provided on one of the two abovementioned disks.

The present inventive idea also involves a special version of the trestle in question, equipped with accessories in the form of modular inclinable right-angled brackets designed to support a second and third keyboard above the first one and resting directly upon the transversal bars attached to the upper ends of the trestle legs, of which, in this particular version, there are four, composed of two pairs of metal section bars positioned side by side and crossing so as to form an 'X' shape, the components of each pair only being connected to one another by the four transversal bars on the ends, of which two go to form the feet of the trestle, resting upon the ground, while the other two are the supporting arms for the first keyboard.

The use of four legs instead of two derives from the need to increase the strength, rigidity and stability of the trestle in view of the increased load that it has to carry, bearing in mind also that the three keyboards, arranged in step formation, are not perfectly aligned and centred in relation to the feet and therefore create a weight distribution that would cause the structure to topple over backwards without the four supporting legs and longer transversal supporting feed on the ground to guarantee the stability of the trestle when loaded.

As already mentioned, the supporting brackets for the second and third keyboards consist of two separate accessory components that may be mounted onto the basic trestle by means of rapid and simple manual operations, using the rear tips of the two transversal arms that support the first keyboard as a point of support and attachment.

In fact, an upright shaft can be fitted onto the end section of said transversal arms by means of a screw that tightens into a threaded element fitted for this purpose inside the end portion of said arms; two brackets are screwed onto the top of said shaft to support the second keyboard and two more brackets may be screwed onto the top of these in order to support a third keyboard.

Between the various brackets, at the point in which each horizontally lying connecting screw is situated, couplings with frontal teeth are provided which, fitting into one another, prevent each bracket from rotating around the single pin that attaches it to the underlying supporting bracket, when the load is applied.

For greater clarity of explanation, the description of the invention continues with reference to the enclosed drawings, included for illustrative and not limitative purposes, wherein:

FIG. 1 is an axonometric view of the trestle according to the invention;

FIG. 2 is an enlarged detail of the rapid and simple device for setting the angle of spread of the crossed legs of the trestle according to the invention.

FIG. 3 is an exploded view of the various components of the joint that connects the transversal bars to the ends of the crossed legs of the trestle according to the invention;

FIG. 4 is an axonometric view of the trestle according to the invention in the version designed to support three keyboards, one above the other;

FIGS. 5 and 6 are two enlarged exploded views of the securing screws and the couplings with frontal teeth by means of which the supporting brackets for the second and third keyboards are fixed.

With reference to the above-mentioned figs., the design according to the invention consists of a carrying structure made up of two pieces of metal section (1a) and (1b), identical with regard to trasverse section and length, centrally hinged by means of a pin (2) which, in addition to functioning as a pivot, also serves to link up the two legs (1a) and (1b) of the trestle.

On the inner sides of the metal pieces (1a) and (1b) two disks (3a) and (3b) are welded, perfectly centered in relation to the pin (2); on one (3b) of the two disks, a series of through holes (4b) is provided, spaced at regular intervals along an arc of circumference near the outer edge, while on the outer face of the other (3a) of the two disks, a pin (4a) is mounted that may slide within a chamber (5) that houses it and guides it, and within which a spring is also inserted that constantly presses upon the pin (4a), pushing it outwards towards the other disk (3b), so that said pin (4a) tends to automatically insert itself inside on of the holes (4b) in the disk (3b) and remain there.

On the end of each leg (1a and 1b) of the trestle according to the invention a transversal bar (6) is attached by means of a connecting joint composed of two semicircular shoes (7a and 7b), equipped with box-type wings (8a and 8b) respectively, of such shape and dimensions that they exactly enclose the ends of the legs (1a and 1b).

The transversal bar (6), on the other hand, remains clasped tetween the semi-circular shoes (7a and 7b) which possess two inward facing radial tabs (9) along their longitudinal edge which hook into two corresponding slots (10) suitably positioned along a generatrix in the centre of the transversal bars (6).

The box-type wings (8a and 8b) have a central hole (11) through which the screw (12) is inserted that, together with a nut (12a), definitively tightens the connecting joint on the outside of the legs (1a and 1b).

With reference to FIGS. 4, 5 and 6, we will now examine the conformation and system of attachment of the brackets used to support a second and third keyboard arranged in step formation above the first one that rests upon the two upper transversal arms (6) of the trestle, which, as mentioned in the introduction, has two pairs of crossed legs (1a and 1b) in this particular version.

On the rear end sections of the upper arms (6) two upright shafts (13) are attached by means of screws (13a), the threaded stems of which are axially inserted along the center line 20 and screwed into the end portion of the arms (6) wherein a hollow, threaded insert has been positioned for this purpose into which the screw (13a) may be tightened.

On the top ends of the two upright shafts (13) two brackets (14) are fixed by means of screws (14a), said brackets (14) having been made from two shafts welded together at right-angles so as to form an inverted 'L'; it is upon the horizontal crosspieces of each bracket (14) that the second keyboard will rest.

Two additional brackets (15) may be attached by means of screws (15a) onto the upright shafts of brackets (14); said brackets (15) are composed of three shafts welded together so as to form a 'C' and it is upon the upper transversal wings (arms) of brackets (15) that the third keyboard will rest, while the lower transversal wings (arms) of said brackets (15) are attached to the upright shafts of the underlying inverted 'L'-shaped brackets (14), as previously mentioned.

When there is a securing screw (13a, 14a, and 15a) couplings (16) with frontal teeth are provided that fit into one another, thus preventing the two shafts connected by the screw from rotating around the axis of the only screw that holds them together, when the load is applied.

Number (17) indicates a small bracket situated on the front edge of the transversal wings of the supporting brackets (14 and 15) designed to prevent the second and third keyboards from falling after sliding forwards along their respective supports.

Number (18) indicates the rubber collars with external longitudinal ribbing that are slipped over all the transversal keyboard support shafts so as to create non-slip surfaces for said keyboards.

I claim:

1. A support for musical keyboards comprising in combination:

a trestle having a first end resting on the floor and a second end supporting a first musical keyboard, the second end of the trestle having at least one pair of spaced-apart transverse bars attached thereto, each transverse bar having a respective back end and a center line, the trestle being adjustble in height such that the musical keyboard may be adjusted to a desired height from the floor;

a pair of upright shafts each having a first end and a second end, means for connecting the first end of each shaft to each respective back end of each transverse bar such that the upright shaft may pivot about the center line of the respective transverse bar and further such that rotation thereabout may be prevented; the second end of each shaft extending upwardly from each respective transverse bar;

a pair of brackets, one bracket mounted perpendicularly to the second end of each respective shaft for support of a second musical keyboard and further such that when the shafts are pivoted about the center lines of the respective transverse bars, the brackets are moved together and apart with respect to one another such that keyboards of varying widths may be supported thereon; and a pair of additional brackets each having an upper arm and a lower arm, means for connecting the lower arm of each additional bracket near the second end of each respective upright shaft such that each additional bracket may pivot forwardly and backwardly about an axis which is perpendicular to the center line of the respective transverse bar and further such that rotation thereabout may be prevented, such that the upper arm of the additional brackets may support a third musical keyboard and when the additional brackets are pivoted about the connecting means, the third musical keyboard may be inclined.

2. The support for musical keyboards of claim 1, wherein the trestle has at least one pair of crossed legs forming an angle and having a central pivot pin therebetween.

3. The support for musical keyboards of claim 2, further comprising the crossed legs each having an inner side; a first disc and a second disc, each respective disc being securely attached to the inner side of each respective leg, the discs being centered about the pivot pin; the first disc having a circumferential arc thereon, a plurality of equally spaced openings therein along the circumferential arc; the second disc having a housing attached thereto; the housing having a straight pin slidably mounted therein such that the pin may extend through the second disc and engage the openings in the first disc; the housing further having a spring therein connected to the straight pin so as to directly urge the pin to engage the openings in the first disc and such that the pin is restrained in the respective opening, permitting adjustment of the angle between the crossed legs, controlling the height of the trestle and permitting complete folding of the legs to a side by side position for ease of storage.

4. The support for musical keyboards of claim 1, wherein the first end of the trestle has at least one pair of spaced apart transverse bars attached thereto, the transverse bars on the second end of the trestle acting as stabilizing feet resting on the floor; the transverse bars at the first and the second end of the trestle being removably connected to the trestle, each connection further comprising two shoes, each shoe having a first end and a second end, the first end being of such shape and dimension to substantially enclose the first end of the trestle, the second ends of each shoe having at least two inward facing radial tabs; each transverse bar having at least two corresponding slots therein to engage the radial tabs on the shoes; the shoes each further having a hole therein which holes are aligned to receive a screw with a nut to secure the shoes about the first end of the trestle and about the transverse bar such as further to permit removal of the shoes to disconnect the transverse bars from the trestle for ease of assembly, disassembly and storage.

5. The support for musical keyboards of claim 1, wherein the means for connecting the first end of each shaft to each respective back end of each transverse bar comprises the back end of each transverse bar having a plurality of teeth thereon and the first end of each upright shaft having a plurality of complementary teeth thereon which may engage the teeth on the end of the respective transverse bar; a screw threadably connecting the end of the upright shaft to the back end of the respective transverse bar such that the screw may be tightened to securely engage the teeth and prevent rotation thereabout and the screw may be loosened to permit pivotal movement of each upright shaft with respect to the center line of the respective transverse bar, thereby permitting the brackets supported by the respective upright shafts to be moved together and apart with respect to one another.

6. The support for the musical keyboard of claim 1, wherein the means for connecting the lower arm of each additional bracket to the second end of the upright shaft comprises the lower arm of each additional bracket having a plurality of teeth thereon and the second end of each upright shaft having a plurality of complementary teeth thereon which may engage the teeth on the lower arm of the respective additional bracket; a screw threadably connecting the arm of the additional bracket to the second end of the respective upright shaft such that the screw may be tightened to securely engage the teeth and prevent rotation thereabout and the screw may be loosened to permit pivotal movement of each additional bracket with respect to the respective upright shaft.

7. A support for musical keyboards comprising in combination:

a trestle having a first end resting on the floor and a second end supporting a first musical keyboard, the second end of the trestle having at least one pair of spaced-apart transverse bars attached thereto, each transverse bar having a respective back end and a center line, the trestle being adjustable in height such that the musical keyboard may be adjusted to a desired height from the floor;

a pair of upright shafts each having a first end and a second end, means for connecting the first end of each shaft to each respective back end of each transverse bar such that the upright shaft may pivot thereabout and further such that rotation thereabout may be prevented; the second end of each shaft extending upwardly from each respective transverse bar;

a pair of brackets, one bracket mounted perpendicularly to the second end of each respective shaft for support of a second musical keyboard and further such that when the shafts are pivoted about the center lines of the respective transverse bars, the brackets are moved together and apart with respect to one another such that keyboards of varying widths may be supported thereon;

a pair of additional brackets each having an upper arm and a lower arm, means for connecting the lower arm of each additional bracket near the second end of each respective upright shaft such that each additional bracket may pivot forwardly and backwardly about an axis which is perpendicular to the center line of the respective transverse bar and further such that rotation thereabout may be prevented, such that the upper arms of the additional brackets may support a third musical keyboard and when the additional brackets are pivoted about the connecting means, the third musical keyboard may be inclined forwardly and backwardly;

wherein the trestle has at least one pair of crossed legs forming an angle and having a central pivot pin therebetween, the crossed legs each having an inner side; a first disc and a second disc, each respective disc being securely attached to the inner side of each respective leg, the discs being centered about the pivot pin; the first disc having a circumferential arc thereon, a plurality of equally spaced openings therein along the circumferential arc; the second disc having a housing attached thereto; the housing having a straight pin slidably mounted therein such that the pin may extend through the second disc and engage the openings in the first disc; the housing further having a spring therein connected to the straight pin so as to directly urge the pin to engage the openings in the first disc and such that the pin is restrained in the respective opening, permitting adjustment of the angle between the crossed legs, controlling the height of the trestle and permitting complete folding of the legs to a side by side position for ease of storage.

8. A support for musical keyboards comprising in combination:

a trestle having a first end resting on the floor and a second end supporting a first musical keyboard, the second end of the trestle having at least one pair of spaced-apart transverse bars attached thereto, each transverse bar having a respective back end and a center line, the trestle being adjustable in height such that the musical keyboard may be adjusted to a desired height from the floor;

a pair of upright shafts each having a first end and a second end, means for connecting the first end of each shaft to each respective back end of each transverse bar such that the upright shaft may pivot thereabout and further such that rotation thereabout may be prevented; the second end of each shaft extending upwardly from each respective transverse bar;

a pair of brackets, one bracket mounted perpendicularly to the second end of each respective shaft for support of a second musical keyboard and further such that when the shafts are pivoted about the center line of the respective transverse bars, the brackets are moved together and apart with respect to one another such that keyboards of varying widths may be supported thereon;

a pair of additional brackets each having an upper arm and a lower arm, means for connecting the lower arm of each additional bracket near the second end of each respective upright shaft such that each additional bracket may pivot forwardly and backwardly about an axis which is perpendicular to the center line of the respective transverse bar and further such that rotation thereabout may be prevented, such that the upper arms of the additional brackets may support a third musical keyboard and when the additional brackets are pivoted about the connecting means, the third musical keyboard may be inclined;

wherein the first end of the trestle has at least one pair of spaced apart transverse bars attached thereto, the transverse bars on the second end of the trestle acting as stabilizing feet resting on the floor; the transverse bars at the first and the second end of the trestle being removably connected to the trestle; each connection further comprising two shoes, each shoe having a first end and a second end, the first end being of such shape and dimension to substantially enclose the first end of the trestle, the second ends of each shoe having at least two inward facing radial tabs; each transverse bar having at least two corresponding slots therein to engage the radial tabs on the shoes; the shoes each further having a hole therein which holes are aligned to receive a screw with a nut to secure the shoes about the first end of the trestle and about the transverse bar such as further to permit removal of the shoes to disconnect the transverse bars from the trestle for ease of assembly, disassembly and storage.

9. A support for musical keyboards comprising in combination:

a trestle having a first end resting on the floor and a second end supporting a first musical keyboard, the second end of the trestle having at least one pair of spaced-apart transverse bars attached thereto, each transverse bar having a respective back end and a center line;

a pair of upright shafts each having a first end and a second end, means for connecting the first end of each shaft to each respective back end of each transverse bar such that the upright shaft may pivot thereabout and further such that rotation thereabout may be prevented; the second end of each shaft extending upwardly from each respective transverse bar;

a pair of brackets, one bracket mounted perpendicularly to the second end of each respective shaft for support of a second musical keyboard and further such that when the shafts are pivoted about the center lines of the respective transverse bars, the brackets are moved together and apart with respect to one another such that keyboards of varying widths may be supported thereon;

a pair of additional brackets each having an upper arm and a lower arm, means for connecting the lower arm of each additional bracket near the second end of each respective upright shaft such that each additional bracket may pivot forwardly and backwardly about an axis which is perpendicular to the center line of the respective transverse bar and further such that rotation thereabout may be prevented, such that the upper arms of the additional brackets may support a third musical keyboard and when the additional brackets are pivoted about the connecting means, the third musical keyboard may be inclined forwardly and backwardly;

wherein the means for connecting the first end of each shaft to each respective back end of each transverse bar comprises the back end of each transverse bar having a plurality of teeth thereon and the first end of each upright shaft having a plurality of complementary teeth thereon which may engage the teeth on the end of the respective transverse bar; a screw threadably connecting the end of the upright shaft to the back end of the respective transverse bar such that the screw may be tightened to securely engage the teeth and prevent rotation thereabout and the screw may be loosened to permit pivotal movement of each upright shaft with respect to the center line of the respective transverse bar, thereby moving the brackets supported by the respective shafts together and apart with respect to one another; and wherein the means for connecting the lower arm of each additional bracket to the second end of the upright shaft comprises the lower arm of each additional bracket having a plurality of teeth thereon and the second end of each upright shaft having a plurality of complementary teeth thereon which may engage the teeth on the lower arm of the respective additional bracket; a screw threadably connecting the arm of the additional bracket to the second end of the respective upright shaft such that the screw may be tightened to securely engage the teeth and prevent rotation thereabout and the screw may be loosened to permit pivotal movement of each additional bracket with respect to the respective upright shaft.

* * * * *